(12) United States Patent
Sonoda et al.

(10) Patent No.: US 6,850,955 B2
(45) Date of Patent: Feb. 1, 2005

(54) STORAGE SYSTEM AND CONTROL METHOD

(75) Inventors: Koji Sonoda, Sagamihara (JP); Naoto Matsunami, Hayama (JP); Manabu Kitamura, Yokohama (JP); Yutaka Takata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 10/075,270

(22) Filed: Feb. 15, 2002

(65) Prior Publication Data

US 2003/0105767 A1 Jun. 5, 2003

(30) Foreign Application Priority Data

Nov. 22, 2001 (JP) ........................................ 2001-358320

(51) Int. Cl.$^7$ ............................................. G06F 17/30
(52) U.S. Cl. ...................... 707/200; 707/201; 707/205
(58) Field of Search .............................. 707/1–10, 100, 707/104.1, 102, 200, 205; 711/148, 2; 710/36, 306; 709/223; 713/2, 502, 154

(56) References Cited

U.S. PATENT DOCUMENTS

| | | | | |
|---|---|---|---|---|
| 5,996,088 A | * | 11/1999 | Frank et al. | ................... 714/6 |
| 6,173,293 B1 | * | 1/2001 | Thekkath et al. | ........... 707/201 |
| 6,324,581 B1 | * | 11/2001 | Xu et al. | .................... 709/229 |
| 2002/0138502 A1 | * | 9/2002 | Gupta | ........................ 707/200 |

* cited by examiner

Primary Examiner—Charles Rones
Assistant Examiner—Neveen Abel-Jalil
(74) Attorney, Agent, or Firm—Antonelli, Terry, Stout & Kraus, LLP

(57) ABSTRACT

The invention provides both interfaces of SAN and NAS, prevents data miss even when a trouble occurs and makes it possible that an arbitrary number of NAS interfaces access the same file system with high performance. A storage system includes multiple interfaces for external connection, multiple disks accessed from multiple interfaces, and a shared memory accessed from multiple interfaces. The multiple interfaces are block interfaces executing disk block I/O request, and file interfaces of file servers executing file I/O request. A file system in the file servers is constructed in a part of the disks, and a log storage area holding change log of the file system, and a management file server information storage area holding information of managing file server performing exclusive access control of file system and management of log storage area are formed in the shared memory.

20 Claims, 8 Drawing Sheets

182

5000 LOG STORAGE AREA MANAGEMENT TABLE

| MANAGEMENT FILE SERVER NUMBER (5001) | LOG STORAGE AREA ADDRESS (5002) | LOG STORAGE AREA SIZE (5003) |
|---|---|---|
| | | |
| | | |
| | | |

5100 DISK MANAGEMENT TABLE

| DISK NUMBER (5101) | DEFAULT MANAGEMENT FILE SERVER (5102) | CURRENT MANAGEMENT FILE SERVER (5103) | LOG KIND (5104) |
|---|---|---|---|
| | | | |
| | | | |
| | | | |

5000
LOG STORAGE AREA MANAGEMENT TABLE

| 5001 | 5002 | 5003 |
|---|---|---|
| MANAGEMENT FILE SERVER NUMBER | LOG STORAGE AREA ADDRESS | LOG STORAGE AREA SIZE |
|  |  |  |
|  |  |  |
|  |  |  |

5100
DISK MANAGEMENT TABLE

| 5101 | 5102 | 5103 | 5104 |
|---|---|---|---|
| DISK NUMBER | DEFAULT MANAGEMENT FILE SERVER | CURRENT MANAGEMENT FILE SERVER | LOG KIND |
|  |  |  |  |
|  |  |  |  |
|  |  |  |  |

FILE SERVER STATE TABLE

| MANAGEMENT FILE SERVER NUMBER | STATE | TIME STAMP | NETWORK INFORMATION |
|---|---|---|---|
| | | | |
| | | | |
| | | | |

7001 / 7002 / 7003 / 7004

STORAGE SYSTEM AND CONTROL METHOD

BACKGROUND OF THE INVENTION

1. Field of the Invention

The present invention relates in general to a storage system and a method of controlling the same. More particularly, the invention relates to a RAID storage system loaded with a NAS function and a SAN function and a method of controlling the same.

2. Description of the Related Art

As the Internet technology has progressed in recent years, the Web application, the streaming application, the E business application and the like have abruptly come into wide use, an amount of data which those applications require has been rapidly increased, and also the storage capacity which the dialy life and the businesses require has been explosively increased. Then, according to an article of "Storage Networking Virtualization (1.1 The need for virtualization)", IBM Redbooks, though the storage cost has been surely reduced, there arises the problem that the management cost for the data has been increased.

As for the technique for solving the above-mentioned problem, there are known the technique called a Storage Area Network (SAN) and the technique called a Network Attached Storage (NAS). According to the above-mentioned article of "Storage Networking Virtualization (3.2.2 Fibre Channel and SAN)", the SAN is such that the high speed network dedicated to the storage is constructed using a Fibre Channel and the dispersed data is consolidated, thereby being adapted to reduce the management cost. Since this technique can eliminate the influence of the network traffic in a Local Area Network (LAN) by using the network dedicated to the storage, it is possible to realize the advanced I/O performance. But, since the function which the SAN provides is the I/O function at the disk block level, it has the side in which it is difficult to hold the data in common between the different hosts or between OSs.

On the other hand, according to an article of "Printer Friendly View White Paper: Network-Attached Storage (2. What is a NAS Device?)", Sun Microsystems, Inc., Monday, Jan. 7, 2002 in http://www.sun.com/ Storage/white-papers/ NAS.html, the NAS is the file server which provides the means for holding the platform-independent storage in common through the Network Protocol such as an NFS or a CIFS. The NAS, similarly to the SAN, can consolidate the dispersed data to reduce the management cost. In addition, the NAS is optimized as the file server, and is directly connected to the LAN to provide the access means at the file level.

While as described above, each of the SAN and the NAS is the technique for consolidating the data to reduce the management cost, since the access means provided by the SAN and the NAS is different between them, proper use in accordance with the use is required therefor. In addition, when the data is consolidated to be held in common between a large number of hosts as described above, the high reliability and the high availability become the important elements.

As described above, the SAN is the network dedicated to the storage, the reliability thereof depends on individual storages connected thereto, and it is possible to provide the high reliability by employing a RAID (Redundant Array of Inexpensive Disks) as the storage. In addition, the RAID provides a plurality of interfaces, whereby even when a trouble occurs in a certain interface, it is possible to continue the service using another interface, and hence it is possible to provide the high availability.

On the other hand, the NAS is a file server having a file system and hence the reliability of the NAS becomes the reliability itself of the file server. However, the file server can not provide the high reliability by only employing the RAID. According to an article of "UNIX INTERNALS: THE NEW FRONTIERS" by Uresh Vahalia, 9.12.5 (pp. 287 and 288), in the file system of UNIX, a buffer cache is provided on a memory in order to enhance the performance, and a plurality of writing processings are got together to carry out the collective disk writing. For this reason, with this technique, the data which is not yet written to the disk is lost in the system crash. The lost data can be classified into two data, i.e., the file data itself and the metadata in which the structure of the file system is described. When the change of the metadata is lost, there arises the problem that the contradiction occurs in the file system so that the file system becomes unable to be used.

As for the method of solving such a problem, there are known the technique of the metadata logging described in the above-mentioned article of "UNIX INTERNALS: THE NEW FRONTIERS (Prentice Hall; ISBN: 013 101 9082, Oct. 23, 1995)" by Uresh Vahalia, 11.7 (pp. 350 and 351), and the technique of the log-structured file system described the article of "UNIX INTERNALS: THE NEW FRONTIERS" by Uresh Vahalia, 11.5 (pp. 345 and 346).

The metadata logging is a method wherein the change log of the metadata is always written to the area which is fixedly provided on the disk, this metadata change log is referred in the system crash, and the change of the metadata which is not yet reflected on the disk is reflected thereon, thereby solving the contradiction of the file system. While the metadata logging can eliminate the occurrence of the contradiction in the file system by utilizing such a method, the possibility that the file data may be lost remains as before.

The log-structured file system is such that the change which is made for the file system is accumulated in the big log entry on the memory to be always written to the last of the log on the disk in the state of holding the consistentness of the file system, whereby it becomes possible to ensure both of the metadata and the user data. But, this file system has the problem that when the system crash occurs before the data is written to the log on the disk, the data which has been preserved in the log entry on the memory is lost.

As for the technique for solving such a problem, there is known the technique described in an article of "Using NUMA Interconnects to Implement Highly Available File Server Appliances (WAFL Over View", Jan. 7, 2002, Network Appliance Co. Ltd. described in http:// www.netapp.com/tech library/ 10004.html. This technique is optimized in such a way as to be dedicated to the NAS, and has a nonvolatile memory (NVRAM) and a RAID disk to construct the log-structured file system on the RAID disk. Then, all of the NFS commands which have been received via the network are logged in the NVRAM, and the log in the state of holding the consistentness is stored in the RAID disk.

With in the above-mentioned technique, even when the system is crashed before the log entry is written to the RAID disk, the file system processing can be executed again to restore the file system to its perfect state by using the NFS command log on the NVRAM after the restoration of the system, and also it is possible to ensure perfectly the data.

In addition, with the above-mentioned technique, it is possible to provide the fail-over function in which two nodes each of which is loaded with the file server are connected through an independent network, and the PAID disk is connected to both of the nodes, whereby even when a trouble occurs in one of the nodes, the other takes over the processing to provide continuously the service. Further, with that technique, the areas in which the copies of the NFS command logs of the other party nodes are ensured in the NVRAMs of the nodes, and when receiving the NFS command, the log is stored on the NVRAM of the node of interest and at the same time, that log is copied in the NVRAM as well of the other party node via the network. Therefore, when the system failure occurs, the NFS command log of the other party node which is preserved on the node of interest and the file system of the PAID disk which was used by the other party node is restored to its former state to be able to continue the service and hence it is possible to provide the high availability.

SUMMARY OF THE INVENTION

While with the above-mentioned prior art, it is possible to reduce the management cost by utilizing the techniques of the SAM and the NAS, respectively, since the RAID providing the storage for the SAN and the file server in the NAS must be realized in the form of the different devices, respectively, there arises the problem that when both of the functions are required, it is necessary to introduce both of the devices, and hence another management cost is increased.

In addition, with above-mentioned prior art which is capable of providing the high reliability and the high availability by the NAS having the two-node configuration, when it is applied to the NAS having a three or more-node configuration, it is necessary to provide the log storage area for the number of nodes in the NVRAM of each of the nodes. As a result, there arises the problem that an amount of memory consumption is increased. Further, with this prior art, it is necessary to carry out the copy to the NVRAMs of all of the nodes whenever receiving the NFS command, and hence there arises the problem that the performance is reduced as the number of nodes is further increased. Moreover, with this prior art, the case where a plurality of nodes change the same file system is not taken into consideration.

In the light of the foregoing, the present invention has been made in order to solve the above-mentioned problems associated with the prior art, and it is therefore an object of the present invention to provide both of a SAN interface and a NAS interface and to provide a storage system, having the SAN and the NAS integrated with each other, which makes possible both of the high reliability in which even when a trouble occurs, no data is lost, and the high-performance access to the same file system made by an arbitrary number of NAS interfaces, and a method of controlling the same.

In addition, it is another object of the present invention to provide a storage system, having the SAN and the NAS integrated with each other, in which the size of a memory for storage of a file system change can be made fixed irrespective of the number of NAS interfaces accessible to the same file system and also a user can specify the size of the memory, and a method of controlling the same.

Furthermore, it is still another object of the present invention to provide a storage system, having the SAN and the NAS integrated with each other, which has the high availability which makes possible the fail-over processing in which even when a trouble occurs in a certain NAS interface, another NAS interface takes over the processing in the certain NAS interface and in which the fail-over processing can be continuously executed as long as the normal NAS interface is present, and a method of controlling the same.

In order to attain the above-mentioned objects, according to the present invention, there is provided a storage system including a plurality of interfaces for the connection to the external network, a plurality of disks to which the plurality of interfaces are accessible, and a shared memory to which the plurality of interfaces are accessible, wherein the plurality of interfaces are loaded with either one of block interfaces for executing an I/O request in disk blocks and file interfaces loaded with file servers for executing an I/O request in files or both of these interfaces; a file system to which a plurality of file servers are accessible in a sharing manner is constructed in a part of the plurality of disks; and a log storage area in which a change log of the file system is held, and a management file server information storage area in which information associated with the file server for management for carrying out the exclusive access control of the file system and the management of the log storage area are constructed in a part of the plurality of disks.

In addition, in order to attain the above-mentioned objects, according to the present invention, there is provided a method of controlling a storage system including a plurality of interfaces for the connection to the external network, a plurality of disks to which the plurality of interfaces are accessible, and a shared memory to which the plurality of interfaces are accessible, wherein the plurality of interfaces are loaded with either one of block interfaces for executing an I/O request in disk blocks and file interfaces loaded with file servers for executing an I/O request in files or both of these interfaces; a file system to which a plurality of file servers are accessible in s sharing manner is constructed in a part of the plurality of disks; and a log storage area in which a change log of the file system is held, and a management file server information storage area in which information associated with the file server for management for carrying out the exclusive access control of the file system and the management of the log storage area are constructed in a part of the plurality of disks, and wherein the associated one of the file servers other than the management file server of the file system receives a file write request from the external network; analyzes the file write request to specify the management file server of the file system containing therein the write subject file; after transmitting file write information to the management file server, receives as the response thereto disk block information used to write user data and log storage address information assigned within the log storage area; after storing the user data in a user data storage area using the log storage address information thus received, changes log status information in the log storage area; after storing the user data in the disk(s) on the basis of disk block information, changes the log status information in the log storage area; and after transmitting file write result information to the management file server of the file system, transmits a response to the file write request received through the external network to the external network.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram useful in explaining information which means for holding management file server information has;

FIG. 7 is a diagram useful in explaining a structure of a file server state table.

DESCRIPTION OF THE EMBODIMENTS

The embodiments of a storage system and a method of controlling the same according to the present invention will hereinafter be described in detail with reference to the accompanying drawings.

Figure 1:
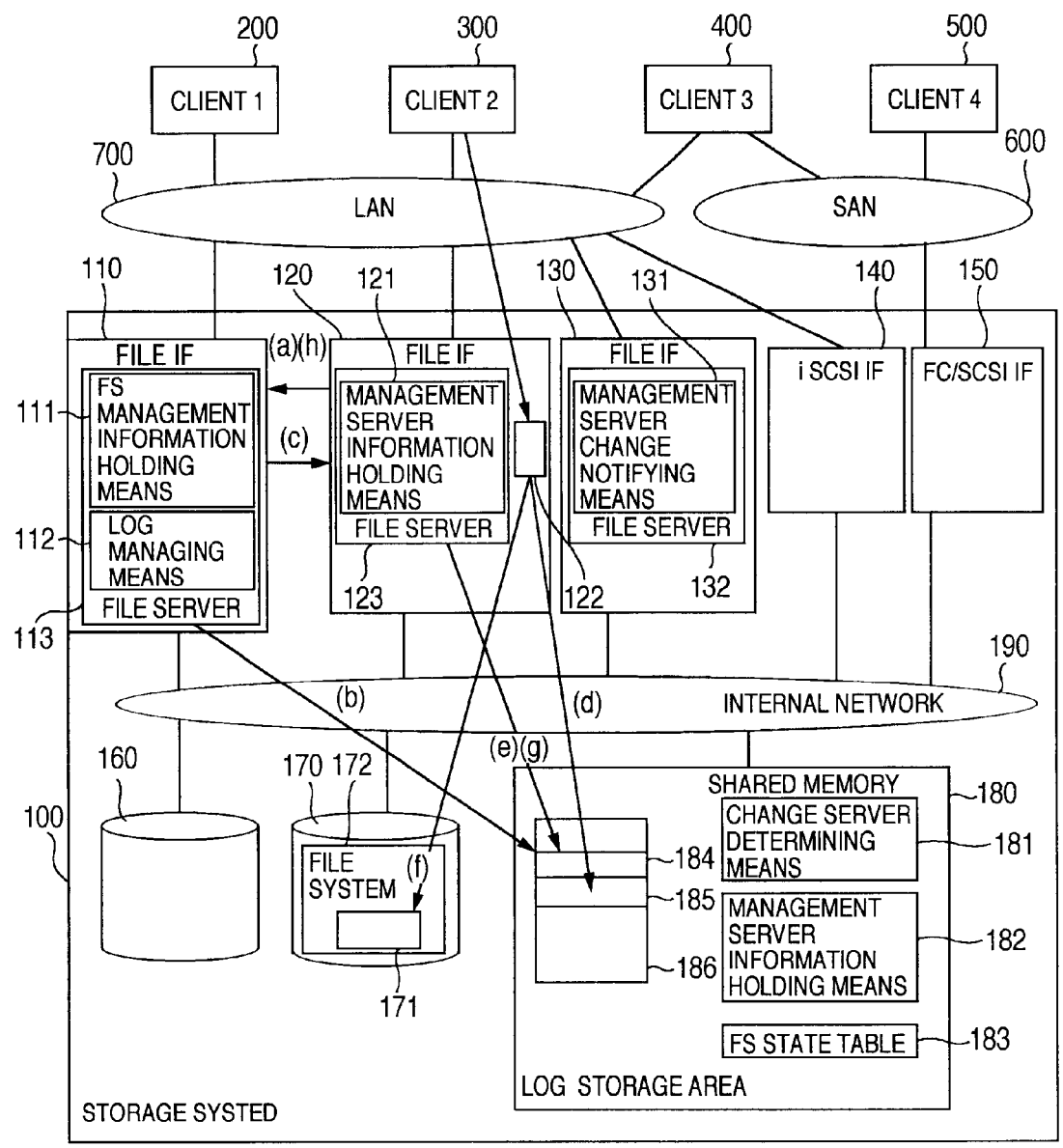
FIG. 1 is a block diagram showing a configuration of a storage system according to one embodiment of the present invention.
Figure 2:
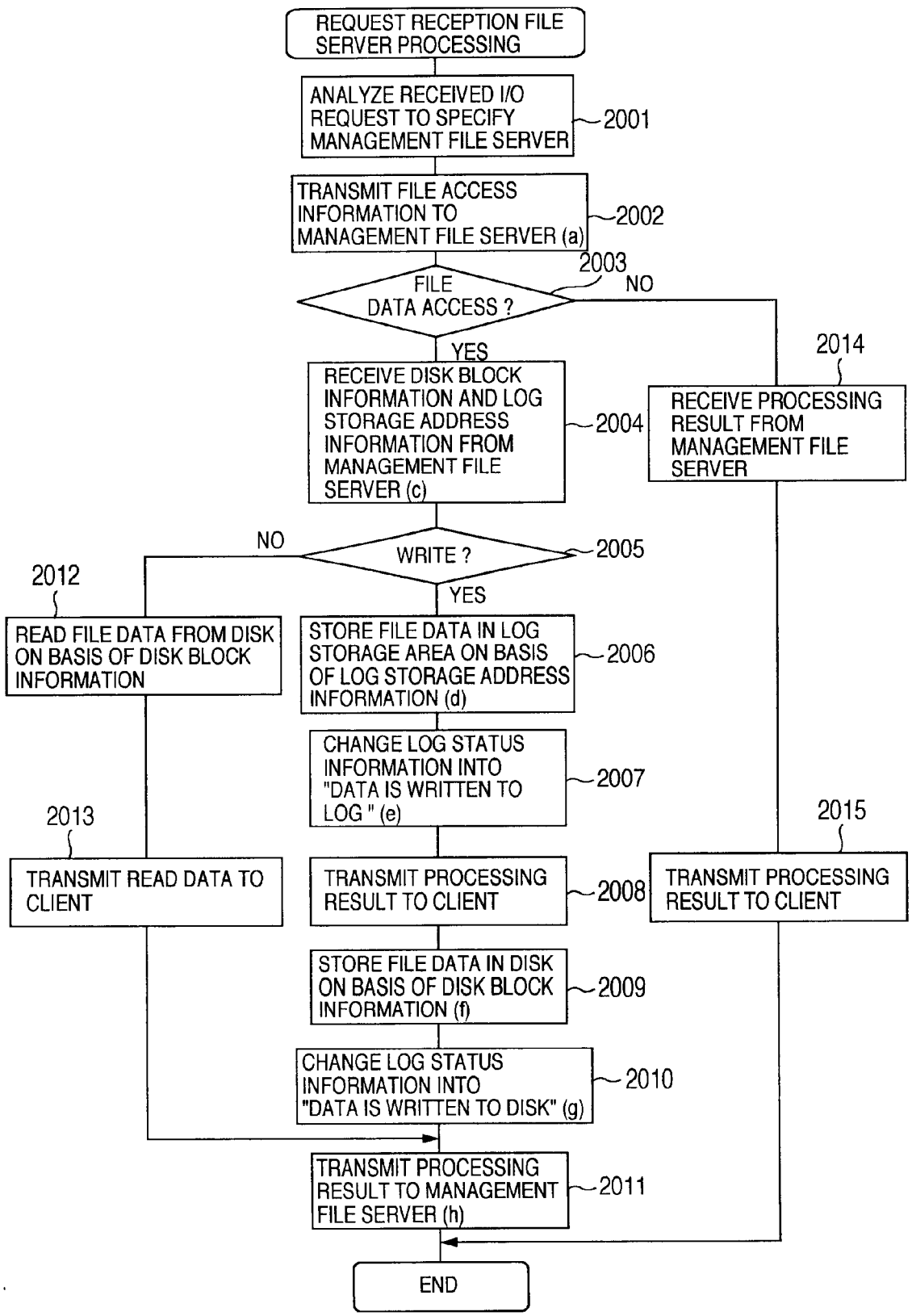
FIG. 2 is a flow chart useful in explaining the processing operation of a file server which receives an I/O request made from a client.
Figure 3:
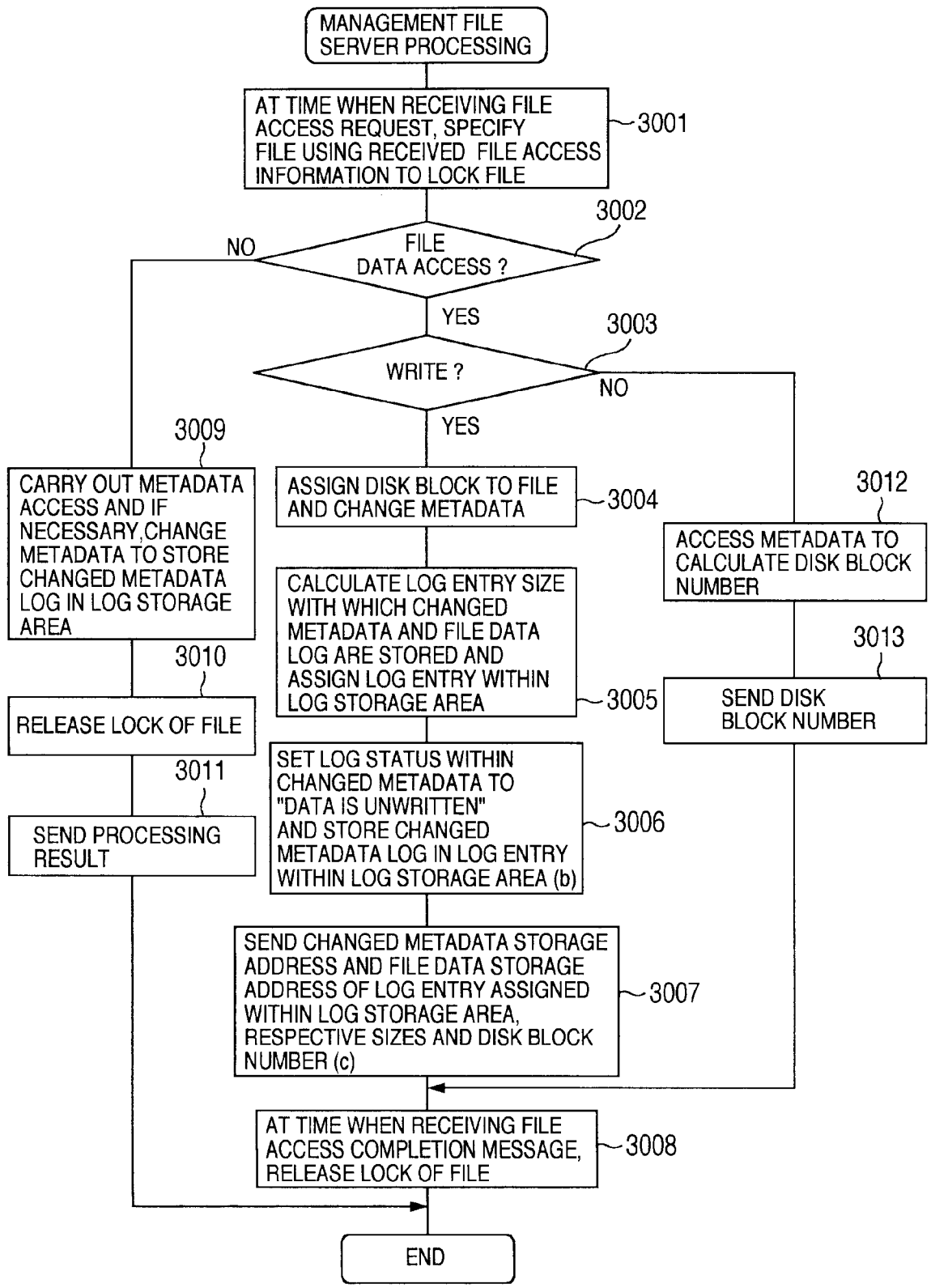
FIG. 3 is a flow chart useful in explaining the processing operation of a management file server.
Figure 4:
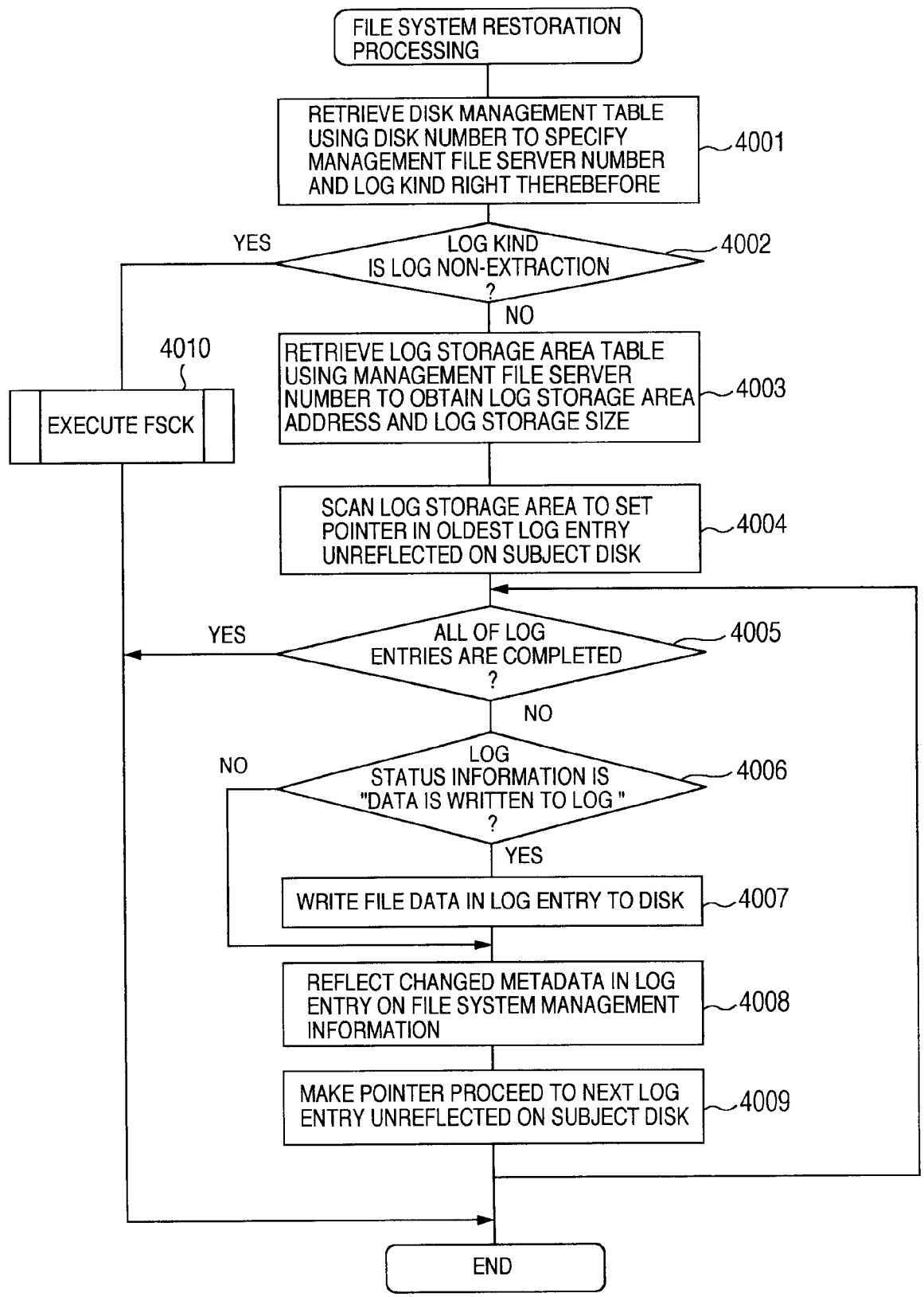
FIG. 4 is a flow chart useful in explaining the processing operation for the file system restoration by the management file server.

FIG. 1 is a block diagram showing a configuration of a storage system according to one embodiment of the present invention, FIG. 2 is a flow chart useful in explaining the processing operation of a file server which receives an I/O request made from a client, FIG. 3 is a flow chart useful in explaining the processing operation of a management file server, FIG. 4 is a flow chart useful in explaining the processing operation for the file system restoration by the management file server, and FIG. 5 is a diagram useful in explaining information which means for holding management file server information has. In FIG. 1, reference numeral 100 designates a storage system; reference numerals 110, 120 and 130 respectively designate file interface boards; reference numeral 111 designates means for holding FS (File System) management information; reference numeral 112 designates means for managing a log storage area; reference numerals 113, 123 and 132 respectively designate file servers; reference numeral 122 designates a unit for accumulating temporarily data; reference numeral 140 designates an iSCSI interface board; reference numeral 150, an FC/SCSI interface board; reference numerals 160 and 170, disks; reference number 171, a disk block to which store a file data: reference numeral 172, a file system; reference numeral 180, a shared memory; reference numeral 181, means for determining a change server; reference numeral 182, means for holding management file server information; 183, a table for holding a file server state; 186, a log storage area; 190, an internal network; 200, 300, 400 and 500, client hosts; 600, a SAN; and 700, a LAN.

The storage system 100 according to this embodiment of the present invention is connected to the LAN 700 and the SAN 600 and is adapted to process an I/O request(s) which has(have) been received thereby from the associated one(s) of the client hosts 200, 300 and 400 connected to the LAN 700, and the associated one(s) of the client hosts 400 and 500 connected to the SAN 600 through the network. This storage system 100 includes the file interface boards 110, 120 and 130 which are loaded with the file servers 113, 123 and 132 respectively, the iSCSI interface board 140 for processing an iSCSI command, the FC/SCSI interface board 150 for processing an SCSI command which has been received through a fiber channel, the disks 160 and 170, and the shared memory 180. Also, the storage system 100 is configured in such a way that the above-mentioned boards, the disks 160 and 170, and the shared memory 180 are connected to one another through the internal network 190.

In the storage system 100, the above-mentioned interface boards are respectively fitted to the different slots. By the way, an arbitrary interface board is detachable from the associated one of the slots in the system operation. Therefore, in the storage system according to this embodiment of the present invention, it is possible to change dynamically the rate of the interface boards in accordance with the use of a user.

The disks 160 and 170 are accessible thereto from each of the above-mentioned interface boards. Then, the disk 160 is the disk to which the iSCSI interface board 140 and the FC/SCSI interface board 150 are to access in blocks, while the file system 172 to which the file server accesses is constructed in the disk 170. By the way, the disk in this case means the logical disk including the RAID. While only one disk is illustrated for the sake of simplicity, in actual, an arbitrary number of disks may be loaded.

The file server 113 is the management file server for the file system 172, and when other file server accesses the file system 172, it necessarily communicates with the file server 113. The file server 113 has the means 111 for holding file system management information and the log management means 112. The means 111 for holding file system management information holds the metadata such as the attribute of the file, the list of the disk block which the file holds, and the unused disk block list within the file system, and the file data, and updates the internal information whenever a change occurs in the file system. But, since such data is stored in such a way as to extend over a plurality of disk blocks on the disk 170, the performance is greatly reduced if such data is stored in the disk whenever a change occurs. For this reason, rewriting of the data to the associated one(s) of the disks is carried out either when the rewriting request is made from the associated one of the client hosts, or at the fixed time intervals.

If the reflection of the changed data on the disk is carried out asynchronously with the file system change processing, when a trouble occurs in the file servers, there is a dangerousness that changed data which is not yet reflected on the disk(s) is lost. In order to prevent this problem, in this embodiment of the present invention, the log of the changed data of the file system is stored in the log storage area 186 provided on the nonvolatile shared memory 180. The log entry stored as the log consists of changed metadata 184 and changed file data 185. The file server 113 uses circularly the log storage area 186 using the log management means 112, and when the changed data of the file system is reflected on the disk(s), releases the log entry containing the corresponding changed data.

Since the storage system according to this embodiment of the present invention, as described above, is adapted to store the log synchronously with the change of the file system, it is possible to leave all of the changed data, and also since the shared memory 180 is nonvolatile, the changed data is not lost at all. In addition, even when a trouble occurs in the file server 113, it is possible that the log data in the log storage area 186 is referred after reactivation to restore the file system to the newest state.

The file server 123 is not the management file server of the file system 172, but when receiving an I/O request from the associated one of the client hosts to the file on the file system 172, accesses the file system 172. Since the file server 123 does not have the metadata information of the file system 172, it is necessary to specify the file server 113 as the management file server of the file system 172 and request the necessary processing. When the I/O request is only the metadata access, all of the file system processings are completed in the file server 113.

On the other hand, in the case of the processing, such as READ or WRITE, for which the access to the file data is required, the processing of the metadata is executed in the file server 113, and the processing of transferring the file data is executed in the file server 123. As a result, it is possible to reduce the load applied to the management file server, and also the copy of the file data between the file servers can be made unnecessary.

As shown in FIG. 5, the means 182 for holding management server information includes a log storage area management table 5000 and a disk management table 5100. The log storage area management table 5000 consists of a number 5001 of the management file server, a log storage area address 5002, and a log storage area size 5003. The management file server 113, when mounting normally the file system 172, assigns the log storage area to store its head address and size in this table 5000, and when mounting the file system 172 after completion of the abnormality, refers to this table 5000 to carry out the restoration of the file system. By the way, in the case where a plurality of file systems are provided, the respective file management servers for a plurality of file systems may be different from one another.

The disk management table 5100 holds a disk number 5001 of each of the disks, a default management file server 5102, a current management file server 5103 and a log kind 5104. The storage system 100 provides the fail-over function of the management file server, and when no fail-over occurs, the management file server which should managing the disk of interest is registered in the default management file server 5102. The management file server which is managing currently the disk of interest is registered in the current management file server 5103 irrespective of presence and absence of the fail-over.

The log kind 5104 describes the kind of changed data stored in the log. As for the kind of charged data, there are two kinds of data, i.e., changed metadata and the file data. One of three matters, i.e., the matter of storing both of the changed metadata and the file data, the matter of storing only the changed metadata, and the matter of not extracting the log at all is registered in the log kind 5104. If both of the changed metadata and the file data are stored in the log, then it is possible to ensure perfectly all of the data. While when only the changed metadata is stored in the log, it is possible to ensure the coherency of the file system, there is the possibility that the file data may be lost. In addition, when no log is extracted at all, there is the possibility that the coherency of the file system as well as the file data may be lost. In this case, before the file system is firstly used after occurrence of the system failure, it is necessary to execute the processing of checking the coherency of the file system and the processing, such as fsck, of carrying out the repair. In general, the processing time of fsck is increased in proportion to the file system size, and hence it may take the processing time of fsck from several minutes to several tens minutes to be executed. Therefore, it can not be used in the fail-over. Since the reliability guarantee of data and the performance have the relationship of the trade-off, if the reliability is enhanced, then the file system access performance is reduced. For this reason, in this embodiment of the present invention, the log kind 5104 is adapted to be specified in accordance with use by a user.

Next, the description will hereinbelow be given with respect to the processing operation in the case where the file server 123 receives an I/O request made from the client host 300 to the file system 172 with reference to a flow chart shown in FIG. 2.

(1) First of all, at the time when analyzing an I/O request received from the client host 300 to detect that this I/O request is an I/O request made to the file system 172, the file server 123 retrieves the data management table 5100 to specify the entry the disk number 5101 of which matches the disk number of the file system 172 to read out the management file server which is stored in its current management file server 5103. In this case, it is assumed that the file server 113 is already set as the management file server (Step 2001).

(2) Next, the file access request is transmitted to the management file server 113. At this time, when the I/O request is the WRITE request, the file data which has been received along with the request is left in the data temporarily storing unit 122 in the file server 123, and is not transmitted to the file server 113 (Step 2002 (refer to (a) in FIG. 1)).

(3) Next, it is judged whether or not the I/O request is the request, such as the READ request or the WRITE request, of accessing the file data. If it is judged that the I/O request is the request of not accessing the file data, then this processing is completed at only the management file server 113. Therefore, in this case, after having received the processing result sent from the file server 113, the file server 123 sends the processing result of interest back to the client host 300 to complete the processing (Steps 2003, 2014 and 2015).

(4) On the other hand, if it is judged in Step 2003 that the I/O request is the request of accessing the file data, then the file server 123 receives the disk block number with which the file data is preserved and the log storage address information from the file server 113. At this time, the reception of the log storage address information is made only in the case of the WRITE request, and hence it is unnecessary in the case of the READ request (Step 2004 (refer to (c) in FIG. 1)).

(5) Next, it is judged whether or not the I/O request is the WRITE request. If it is judged that the I/O request is not the WRITE request, i.e., the I/O request is the READ request, since only the disk block number with which the file data is stored is received from the file management server 113, the disk 172 is accessed using the received disk block number to read out the file data to send the file data thus read out to the client host 300. Thereafter, the processing result is sent back to the file server 113 to complete the processing (Step 2005, 2012, 2013 and 2011).

(6) On the other hand, if it is judged in Step 2005 that the I/O request is the WRITE request, then the file data is stored from the data temporarily accumulating unit 122 to the changed file data storage area 185 using the log storage address information which has been received from the file server 113. Thereafter, the log status information stored in the changed metadata storage area 184 is changed into the state of "data is written to log" (Step 2006 (refer to (d) in FIG. 4), and Step 2007 (refer to (e) in FIG. 1)).

(7) Since by the processing until now, all of the I/O requests made from the client 300 are reflected on the log storage area 186, even if hereinafter, a trouble occurs in the file server 113, the file system 172 can be restored to the newest state using the log information. For this reason, the file server 123 sends the processing result to the client host 300 (Step 2008).

(8) Next, the file server 123 stores the file data which is stored in the data temporarily accumulating unit 122 until now to the disk block 171 in the disk 170 using the disk block information received from the file server 113, and then changes the log status information into the state of "data is written to disk", and further sends the processing result to the file server 113 to complete the processing (Steps 2009 (refer to (f) in FIG. 1) to 2011 (refer to (h) in FIG. 1)).

While the processing for the I/O request executed by the file server 123 is as described above, even when the file server accessing the file system 172 is present in addition to the file server 123, the processing of storing the file data in the log storage area 186 and the processing of accessing the disk 170 can be executed in parallel with each other. As a result, it is possible to provide the high speed I/O processing performance.

Next, the description will hereinbelow be given with respect to the processing operation in the management file server 113 with reference to a flow chart shown in FIG. 3. While in this case, the description is given with respect to the processing when receiving a file access request made from the file server 123, this is also applied to the case where a file access request is received from any one of other file servers.

(1) At the time when having received a file access request made from the file server 123, the management file server 113 analyzes the file access request to specify the file which is to be accessed using the means 111 for holding file system management information and at the same time to lock the file (Step 3001).

(2) Next, it is judged whether the file access request is the file data access request such as the READ request or the WRITE request, or the request other than the file data access request. If it is judged that the file access request is the request other than the file data access request, then it is unnecessary to send the disk block number and the log storage address information back to the file server 123, and only the metadata access is carried out by the server of interest to complete the processing. For this reason, the management file server 113 carries out the metadata access and when the metadata is changed, stores the changed metadata in the log entry which is assigned by the log managing means 112. Thereafter, the lock of the file is released and the processing result is sent to the file server 123 to complete the processing (Steps 3002, and 3009 to 3011).

(3) on the other hand, if it is judged in Step 3002 that the file access request is the file data access request, then it is judged whether or not the I/O request is the WRITE request. If it is judged that the I/O request is not the WRITE request, i.e., the I/O request is the READ request, since the change for the file system does not occur, it is unnecessary to store the log. Therefore, the management file server 113 accesses the metadata, calculates the disk block number with which the file data is stored, and sends the disk block number to the file server 123 (Steps 3003, 3012 and 3013).

(4) If it is judged in Step 3003 that the I/O request is the WRITE request, then the disk block 171 in which the file data is stored is assigned and also the metadata is changed. Next, the log entry size with which the changed metadata and the file data to be written are both stored is calculated and the log entry including the changed metadata storage area 184 and the file data storage area 185 in the log storage area 186 is assigned (Steps 3004 and 3005).

(5) Then, after having set the log status information in the changed metadata to "data is unwritten", the changed metadata is stored in the changed metadata storage area 184, and next the addresses and the sizes of the changed metadata storage area 184 and the file data storage area 185, and the disk block number which was assigned in the processing in Step 3004 are sent to the file server 123 (Step 3006 (refer to (b) in FIG. 1), and Step 3007 (refer to (c) in FIG. 1)).

(6) At the time when the message of completion of the file access has been received from the file server 123 after completion of the processing in Step 3007 or in Step 3013, the lock of the file is released to complete the processing (Step 3008).

Next, the description will hereinbelow be given with respect to the processing operation in which the management file server 113 restores the file system to the newest state with reference to a flow chart shown in FIG. 4. In this case, it is assumed that a trouble occurs in the management file server 113, and then the management file server 113 is recovered from the trouble to restore the file system 172 to the newest state.

(1) First of all, the management file server 113 retrieves the disk management table 5100 using the disk number with which the file system 172 is stored to specify the entry in which the disk 170 is stored, and then refers to the current management file server 5103 to specify the management file server which managed the file system 172 right before this processing. In this case, it is assumed that the file server 113 is stored. In addition, the log kind field 5104 is referred to acquire the log kind (Step 4001).

(2) Next, it is judged whether or not the log kind acquired in Step 4002 is "log use". If it is judged that the log kind is "log no use", since the restoration using the log is impossible, after fsck as the file system check program is activated to restore the file system to the newest state, the processing of restoring the file system is completed (Steps 4002 and 4010).

(3) On the other hand, if it is judged in Step 4002 that the log kind is not "log no use", then the log storage area management table 5000 is retrieved to obtain the address and the size of the log storage area of the management file server 113. Thereafter, the log storage access 186 is scanned to set the pointer of the log entry to the log entry which holds the changed log unreflected on the disk 170 (Steps 4003 and 4004).

(4) Next, it is checked whether or not all of the changed logs for the file system 172 have been reflected on the disk 170. If it is judged that all of the changed logs have already been reflected on the disk 170, then the processing of restoring the file system is completed. On the other hand, if it is judged that some of the unreflected log entries are still present, then the log entry to which the pointer points is referred to check whether or not the log status information thereof is in the state of "data is written to log" (Steps 4005 and 4006).

(5) If it is judged in Step 4006 that the log status information is in the state of "data is written to log", since it is shown that the file data is stored in the log, but is unreflected on the disk(s), the file data stored in the log is stored in the disk in accordance with the disk block information of the metadata changed log (Step 4007).

(6) After completion of the processing in Step 4007, the changed metadata is reflected on the management information of the file system and then the pointer is made proceed to the next unreflected log entry relating to the file system 172. Then, the process is returned back to the processing in Step 4005 to execute repeatedly the processings in Steps 4005 to 4009 (Steps 4008 and 4009).

(7) On the other hand, if it is judged in Step 4006 that the log status information is not in the state of "data is written to log", since the data in the file data storage log area is meaningless, the processing in Step 4007 is not executed, but the processings from Step 4008 are executed.

The processings described with reference to FIG. 4 are repeatedly executed with respect to all of the log entries, whereby it is possible to restore the file system to the newest state. At the time when the processing of all of the log entries stored in the log storage area 186 has been completed, all of the log entries in the log storage area 186 are released.

According to this embodiment of the present invention having the configuration as described above and executing the processings as described above, it is possible to provide the SAN/NAS integrated storage system which is capable of providing both of the SAN interface and the NAS interface at an arbitrary ratio, of obtaining the high reliability with which no data is lost even in occurrence of a trouble, and of making it possible that an arbitrary number of NAS interfaces access the same file system with high performance.

Figure 6:
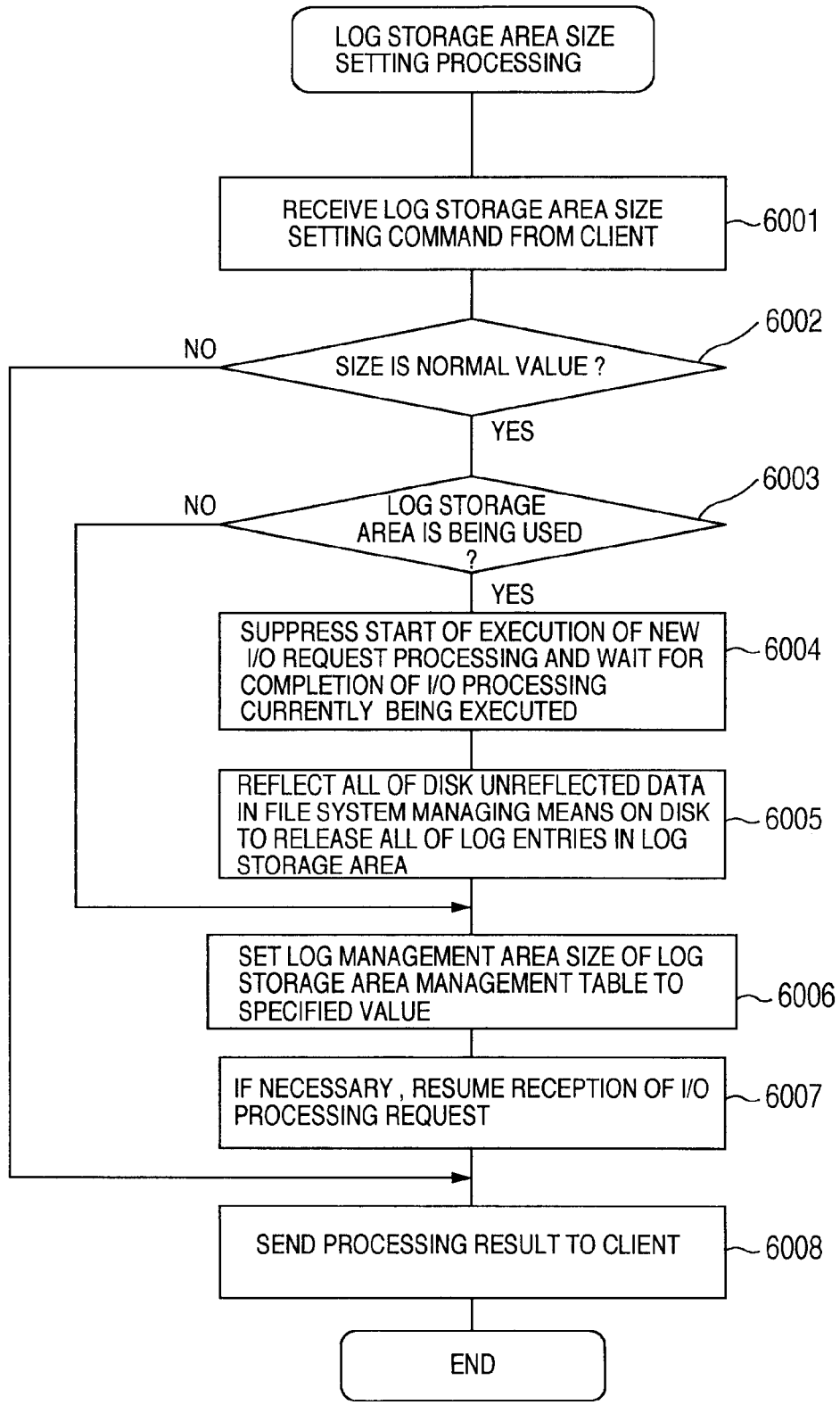
FIG. 6 is a flow chart useful in explaining an example of the processing operation of the management file server when the size of a log storage area is set from a client host.

FIG. 6 is a flow chart useful in explaining an example of the processing operation of the management file server when setting the size of the log storage area from a client host, and next this example will hereinbelow be described in detail.

(1) At the time when having received a log storage area size setting command from the associated one of the client hosts, the management file server 113 judges whether or not the value of the received size falls within the normal range. If it is judged that the value of the received size falls outside of the normal range, then the information of an error is sent as the processing result to the client host of interest to complete the processing in this example (Steps 6001, 6002 and 6008).

(2) On the other hand, if it is confirmed on the basis of the judgement in Step 6002 that the log storage size falls within the normal range, then it is judged on the basis of the check made by the log managing means 112 whether or not the log storage area 186 is being used (the data is present in the area). If it is judged that the log storage area is being used, next, the start of the new I/O request processing is suppressed and also the completion of the I/O processing which is being currently executed is waited for (Steps 6003 and 6004).

(3) Thereafter, in Step 6005, all of the disk unreflected data in the means 111 for holding file system management information are reflected on the disk. As a result, all of the log entries in the log storage area 186 are released so that the state of the log storage area 186 becomes equal to the unused state (Step 6005).

(4) After completion of the processing in Step 6005, or when it is judged in Step 6003 that the log storage area 186 is not being used, the log storage area having the specified size is ensured in the shared memory 180, and its address and size are stored in the log storage area address field 5001 and the log storage area size field 5002 in the log storage area management table 5000, respectively. Thereafter, the I/O processing is resumed and the processing result is sent to a client to complete the processing (Steps 6006 to 6008).

While in the above-mentioned example shown in FIG. 6, it is not checked whether or not the client host which has transmitted the command to change the log storage area size has the suitable privilege, the check for the suitable privilege may also be carried out after having received the command.

According to this embodiment of the present invention, by extracting the above-mentioned processings, it is possible to make fixed the size of the memory for storing the file system change log irrespective of the number of NAS interfaces accessible to the same file system, and also it is possible to set the size of interest to the value which is specified by a client.

Figure 8:
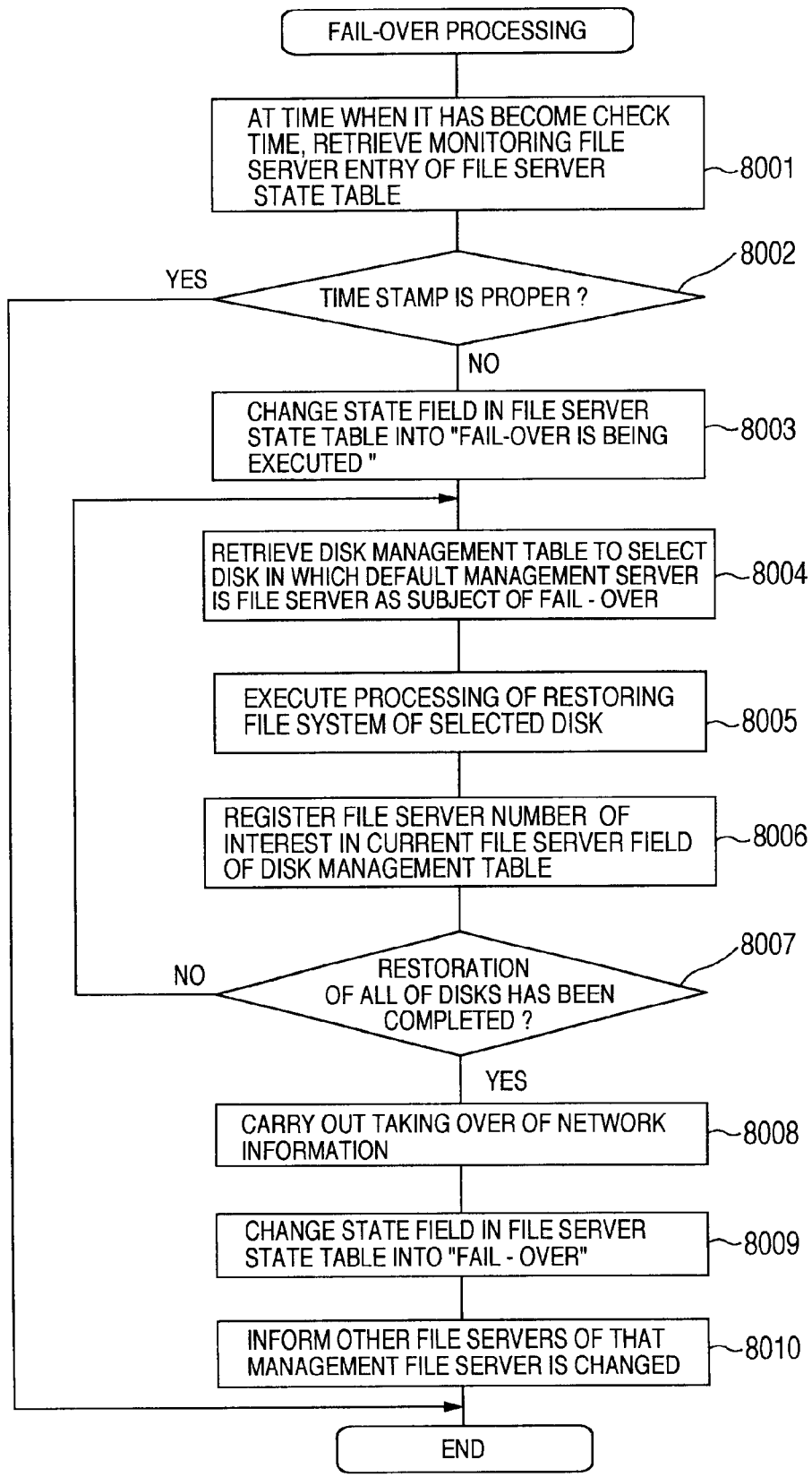
FIG. 8 is a flow chart useful in explaining the monitoring of a management file server by a file server and the processing operation for fail-over.

FIG. 7 is a diagram useful in explaining the structure of the file server state table 183, and FIG. 8 is a flow chart useful in explaining the processing operation of the monitoring of the file server 113 by the file server 132, and the fail-over. Next, the description will hereinbelow be given with respect to the fail-over processing in which when a trouble occurs in the management file server, another file server takes over the processing in the management file server.

An example described in this case is the processing in which the means 181 for determining an alternative server present in the shared memory 180 monitors the state of a certain management file server, and determines an alternative file server which is to take over the processing in the certain management file server when the abnormality occurs in the certain management file server, and the alternative file server determined by the alternative server determining means 181 monitors the state of the management file server as the subject of the monitoring at all times using the file server state table 183, and upon detection of the abnormality, starts the fail-over processing. In this example described in this case, it is assumed that the alternative file server of the management file server 113 is the file server 132.

The file server state table 183, as shown in FIG. 7, consists of a file server number 7001, a state 7002, a time stamp 7003 and network information 7004 such as an IP address and an MAC address. Each of the file servers updates the time stamp 7003 of the file server state table 183 at fixed refresh time intervals. The alternative file server inspects the time stamp 7003 of the file server as the subject of the monitoring at fixed check time intervals, and when the value of the time stamp 7003 is properly updated, judges that the file server as the subject of the monitoring is properly operated, while when the value of the time stamp 7003 is not properly updated, judges that the abnormality occurs to start the fail-over processing. Now, it is necessary that the value of the check time interval is larger than that of the refresh time interval.

Next, the description will hereinbelow be given with respect to the operation of the monitoring of the file server 113 and the fail-over processing by the file server 132 with reference to a flow chart shown in FIG. 8.

(1) At the time when it has become the time to carry out the check, the file server 132 retrieves the entry of the file server 113, as the subject of the monitoring, from the file server state table 183 to check the time stamp 7003 to judge whether or not the value of the time stamp is properly updated. If it is judged that the value of the time stamp is properly updated, nothing is carried out to complete the processing (Steps 8001 and 8002).

(2) If it is judged in Step 8002 that the value of the time stamp is not properly updated, then the file server 132 starts the fail-over processing. Then, first of all, the file server 132 sets the state 7001 of the file server 113 in the file server state table 183 to "fail-over processing is being executed" to suppress the activation of the double fail-over processing (Step 8003).

(3) Next, the file server 132 retrieves the disk management table 5100 to acquire the entry of the disk in which the default management file server 5102 is the file server 113 to execute the processing of restoring the disk thus acquired. The restoration processing in this case is executed similarly to the restoration processing described with reference to FIG. 4 (Steps 8004 and 8005).

(4) After completion of the restoration processing of the disk, next, the number of the file server 132 as the alternative file server is stored in the current file server of the disk management table to judge whether or not the restoration of all of the disks which were managed by the file server 113 has been completed. If it is judged that some of the disks for which the restoration processing is not yet completed are present, the process is returned back to the processing in Step 8004 to execute repeatedly the processings from Step 8004 to 8007 (Steps 8006 and 8007).

(5) After the restoration processing with respect to all of the disks which were managed by the file server 113 has been completed, next, the network information 7004 of the file server state table is referred so that the network adapter of the file server 132 takes over the information which was set in the network adapter of the file server 113 (Step 8008).

(6) Thereafter, the state 7002 of the file server 113 in the file server state table is changed into the "fail-over" state, and finally, the file server 132 informs other file servers of the change of the management file server using the means 131 for posting file management server change to complete the fail-over processing (Steps 8009 and 8010).

In the above-mentioned processings, the file server 123 which has received the management file server change notification reads out the information of the means 182 for holding management file server information from the shared memory 180 again to store the information thus read out in the means 121 for holding management server information in the file server 123. In addition, at a time point when the alternative file server 132 has detected the abnormality of the file server 113, the means 181 for determining an alternative server redetermines the alternative file server for all of the file servers to inform each of the file servers of this fact. By executing this processing, it becomes possible that the file servers in the normal state monitor each other at all times.

According this embodiment of the present invention, by executing the processings described with reference to FIG. 8, even if a trouble occurs in a certain NAS interface, it is possible to continue the service using the fail-over processing as long as the normal NAS interface is present in addition thereto to realize the high availability.

As set forth hereinabove, according to the present invention, since a plurality of NAS interfaces can access the same file system, it is possible to obtain the high reliability with which no data is lost even when a trouble occurs while providing the performance proportional to the number of interfaces. In addition, it is possible to carry out continuously the file access service as long as even one normal NAS interface is present.

It should be further understood by those skilled in the art that the foregoing description has been made on embodiments of the invention and that various changes and modifications may be made in the invention without departing from the spirit of the invention and the scope of the appended claims.

What is claimed is:

1. A storage system including a plurality of interfaces for the connection to the external network, a plurality of disks to which said plurality of interfaces are accessible, and a shared memory to which said plurality of interfaces are accessible, wherein said plurality of interfaces are loaded with either one of block interfaces for executing an I/O request in disk blocks and file interfaces loaded with file servers for executing an I/O request in files or both of these interfaces; a file system to which a plurality of file servers are accessible in a sharing manner is constructed in a part of said plurality of disks; and a log storage area in which a change log of the file system is held, and a management file server information storage area in which information associated with the file server for management for carrying out the exclusive access control of said file system and the management of said log storage area are constructed in a part of said shared memory.

2. A storage system according to claim 1, wherein said change log includes both of change metadata of said file system and write data contained in an I/O request.

3. A storage system according to claim 1, wherein the management file server information is setting information exhibiting whether only the change metadata is stored in said log storage area, or both of the change metadata and write request data are stored in said log storage area.

4. A storage system according to claim 1, wherein said management file server includes an interface for setting a size of said log storage area.

5. A storage system according to claim 1, wherein the associated one of the file servers other than said management file server of said file system includes means for when a trouble occurs in said management file server, restoring said file system using a change log stored in the log storage area which was managed by said management file server.

6. A storage system according to claim 2, wherein said management file server includes an interface for setting a size of said log storage area.

7. A storage system according to claim 2, wherein the associated one of the file servers other than a management file server of said file system includes:

means for transmitting file access information containing file identification information and access area information to said management file server for carrying out the management of said file system, in which a file is stored which is accessed by an I/O request received from the external network, to receive as the response thereto disk block information and log storage address information;

means for storing therein write data contained in the file I/O request in said shared memory on the basis of the log storage address information; and means for storing therein the write data in the associated one of said disks, in which said file system is constructed, on the basis of the disk block information.

8. A storage system according to claim 2, wherein the associated one of the file servers other than said management file server of said file system includes means for when a trouble occurs in said management file server, restoring said file system using a change log stored in the log storage area which was managed by said management file server.

9. A storage system according to claim 7, wherein said management file server includes an interface for setting a size of said log storage area.

10. A storage system according to claim 7, wherein said management file server includes:

means for receiving file access information from other file servers;

management means, for said file system, for locking the corresponding file using the received file access information, assigning disk blocks and calculating the corresponding disk block information;

log storage area managing means for assigning log storage addresses in the log storage area using the file access information; and means for transmitting disk block information and log storage address information to the associated one of said file servers which has transmitted thereto the file access information.

11. A storage system according to claim 3, wherein the associated one of the file servers other than a management file server of said file system includes:
  means for transmitting file access information containing file identification information and access area information to said management file server for carrying out the management of said file system, in which a file is stored which is accessed by an I/O request received from the external network, to receive as the response thereto disk block information and log storage address information;
  means for storing therein write data contained in the file I/O request in said shared memory on the basis of the log storage address information; and
  means for storing therein the write data in the associated one of said disks, in which said file system is constructed, on the basis of the disk block information.

12. A storage system according to claim 11, wherein said management file server includes:
  means for receiving file access information from other file servers;
  management means, for said file system, for locking the corresponding file using the received file access information, assigning disk blocks and calculating the corresponding disk block information;
  log storage area managing means for assigning log storage addresses in the log storage area using the file access information; and
  means for transmitting disk block information and log storage address information to the associated one of said file servers which has transmitted thereto the file access information.

13. A storage system according to claim 3, wherein said management file server includes an interface for setting a size of said log storage area.

14. A storage system according to claim 3, wherein the associated one of the file servers other than said management file server of said file system includes means for when a trouble occurs in said management file server, restoring said file system using a change log stored in the log storage area which was managed by said management file server.

15. A method of controlling a storage system including a plurality of interfaces for the connection to the external network, a plurality of disks to which said plurality of interfaces are accessible, and a shared memory to which said plurality of interfaces are accessible,
  wherein said plurality of interfaces are loaded with either one of block interfaces for executing an I/O request in disk blocks and file interfaces loaded with file servers for executing an I/O request in files or both of these interfaces; a file system to which a plurality of file servers are accessible in a sharing manner is constructed in a part of said plurality of disks; and a log storage area in which a change log of said file system is held, and a management file server information storage area in which information associated with the file server for management for carrying out the exclusive access control of said file system and the management of said log storage area are constructed in a part of said shared memory, and
  wherein the associated one of the file servers other than said management file server of said file system receives a file write request from the external network; analyzes the file write request to specify the management file server of said file system containing therein the write subject file; after transmitting file write information to said management file server, receives as the response thereto disk block information used to write user data and log storage address information assigned within said log storage area; after storing the user data in a user data storage area using the log storage address information thus received, changes log status information in said log storage area; after storing the user data in the disk(s) on the basis of disk block information, changes the log status information in said log storage area; and after transmitting file write result information to said management file server of said file system, transmits a response to the file write request received through the external network to the external network.

16. A method of controlling a storage system according to claim 15, wherein said management file server, at the time when having received file write information from the associated one of the file servers other than said management file server, locks a file as the subject of the writing, and assigns disk blocks in which user data is written on said disks; after having stored change information and log status information of file system management data in said log storage area, transmits the assigned disk block information and log storage area information to the associated one of the file servers, other than said management file server, which has transmitted thereto the file write information; and at the time when receiving file write result information from the associated one of the file servers, other than said management file server, which has transmitted thereto the file write information, releases the lock of the file as the subject of the writing.

17. A method of controlling a storage system according to claim 16, wherein the associated one of the file servers other than said management file server, when recognizing that a trouble occurs in said management file server, refers to the management file server information to specify the log storage area which has been managed by said management file server and refers successively to the change logs stored in the specified log storage area to reflect the change processing on the file system(s) on which the change logs are not yet reflected; after completion of the processing of reflecting thereon all of the change logs, takes over the exclusive access control and the log management areas of all of the file systems which have been managed by said management file server to inform other file servers other than said management file server of that said management file server has been changed.

18. A method of controlling a storage system according to claim 17, wherein said processing of reflecting the change log is the processing in which when the change processing is the file writing, the log status information is referred; when the log status information has become the user data unwritten state, the processing of reflecting the change log on the file system(s) is not executed; when the log status information has become the status of completion of the user data disk writing, only the file system management data on the file system(s) is changed in accordance with the change log; and when the log status information has become the state of completion of the user data log writing, the file system management data on the file system(s) is changed after having reflected the user write data contained in the change log on the file system(s).

19. A method of controlling a storage system according to claim 15, wherein the associated one of the file servers other than said management file server, when recognizing that a trouble occurs in said management file server, refers to the management file server information to specify the log storage area which has been managed by said management file server and refers successively to the change logs stored in the specified log storage area to reflect the change processing on the file system(s) on which the change logs are not yet reflected; after completion of the processing of reflecting thereon all of the change logs, takes over the exclusive access control and the log management areas of all of the file systems which have been managed by said management file server to inform other file servers other than said management file server of that said management file server has been changed.

20. A method of controlling a storage system according to claim 19, wherein said processing of reflecting the change log is the processing in which when the change processing is the file writing, the log status information is referred; when the log status information has become the user data unwritten state, the processing of reflecting the change log on the file system(s) is not executed; when the log status information has become the status of completion of the user data disk writing, only the file system management data on the file system(s) is changed in accordance with the change log; and when the log status information has become the state of completion of the user data log writing, the file system management data on the file system(s) is changed after having reflected the user write data contained in the change log on the file system(s).

* * * * *